Patented July 22, 1924.

1,502,190

UNITED STATES PATENT OFFICE.

WALTER HEERDT, OF FRANKFORT-ON-THE-MAIN, GERMANY.

INSECTICIDE.

No Drawing.  Application filed June 9, 1923.  Serial No. 644,519.

*To all whom it may concern:*

Be it known that I, WALTER HEERDT, a citizen of Germany, residing at Unionhaus, 9 Steinweg, Frankfort-on-the-Main, Germany, have invented certain new and useful Improvements in Insecticides, of which the following is a specification.

My invention relates to an insecticide and more especially to a composition of matter containing hydrocyanic acid.

According to my invention the fluid hydrocyanic acid having a low boiling point and containing 95-100 per cent CNH is caused to be absorbed by porous bodies such as kieselguhr, diatomit, absorptive carbon and the like, and this product is then enclosed in tight receptacles such as tins. The size of a tin can, for instance, be such that the contents of one or several tins suffices for filling the room to be freed from insects with gas. In this room the tin is opened by a man wearing a gas-mask and the powder spread about in a thin layer, whereby the hydrocyanic acid is caused to evaporate in a short time. The absorbent left over can be used for the preparations of fresh quantities of the composition or can be thrown away without further precautions.

A stabilizing agent such as sulphuric acid or oxalic acid can be added to the hydrocyanic acid in order to prevent this latter from decomposing. Chloroformic acid methyl ester or other halogenized hydrocarbons can also be added.

I wish it to be understood that I do not desire to be limited to the exact details of operation described, for obvious modifications will occur to a person skilled in the art.

I claim:

1. A composition of matter for use as insecticide consisting of a porous body and fluid hydrocyanic acid filling the pores of said body.

2. A composition of matter for use as insecticide consisting of kieselguhr imbibed with fluid hydrocyanic acid.

3. A composition of matter for use as insecticide consisting of a porous body and a mixture of fluid hydrocyanic acid and a halogenized hydrocarbon.

4. A composition of matter for use as insecticide consisting of a porous body and a mixture of fluid hydrocyanic acid, a halogenized hydrocarbon and a stabilizing agent.

In testimony whereof I affix my signature.

WALTER HEERDT.

Witnesses:
H. SCHICKERT,
C. C. L. B. WYLES.